(No Model.)

2 Sheets—Sheet 1.

J. B. ARMSTRONG.
ROAD CART.

No. 504,771.

Patented Sept. 12, 1893.

Witnesses
F. R. Cornwall
I. M. Cornwall

Inventor,
John Belmer Armstrong
by F. W. Ritter Jr.
Atty (No Model.)
2 Sheets—Sheet 2.

J. B. ARMSTRONG.
ROAD CART.

No. 504,771. Patented Sept. 12, 1893.

Witnesses
F. R. Cornwall
I. M. Cornwall

Inventor
John Belmer Armstrong
by F. W. Ritter Jr
Atty

United States Patent Office.

JOHN BELMER ARMSTRONG, OF GUELPH, CANADA; ROBERT TORRANCE ADMINISTRATOR OF SAID ARMSTRONG, DECEASED.

ROAD-CART.

SPECIFICATION forming part of Letters Patent No. 504,771, dated September 12, 1893.

Application filed May 26, 1892. Serial No. 434,426. (No model.)

*To all whom it may concern:*

Be it known that I, JOHN BELMER ARMSTRONG, a subject of the Queen of Great Britain, residing at Guelph, in the county of Wellington, Province of Ontario, Canada, have invented certain new and useful Improvements in Road-Carts; and I hereby declare the following to be a full, clear, and exact description of the same, reference being had to the accompanying drawings, wherein—

Figure 1:
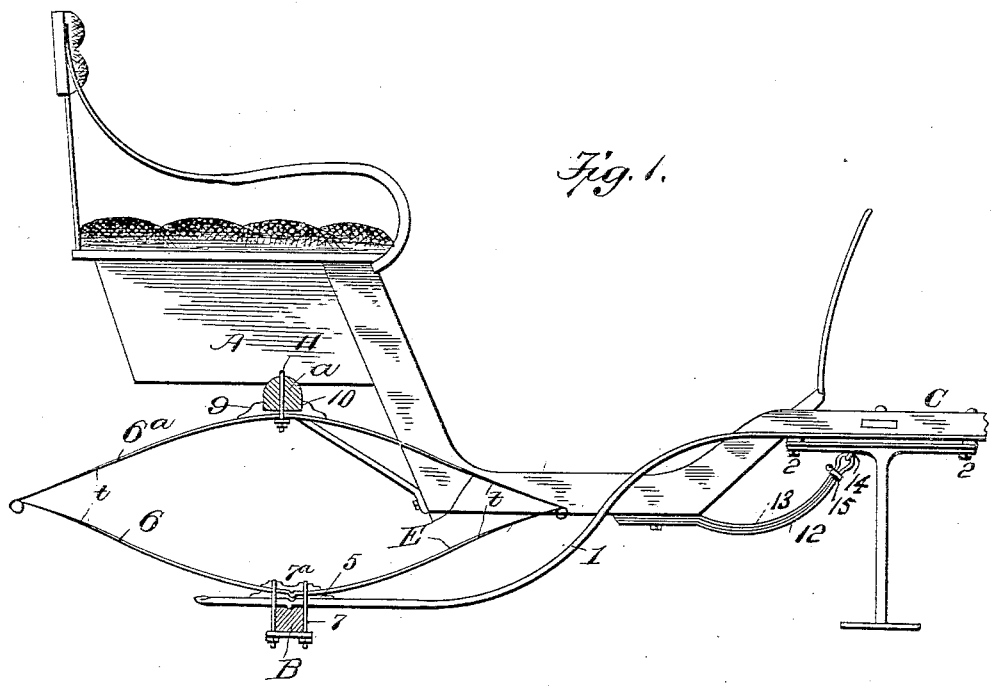
Figure 2:
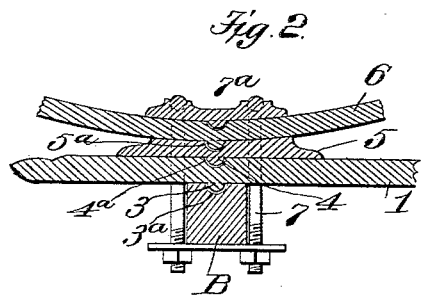
Figure 3:
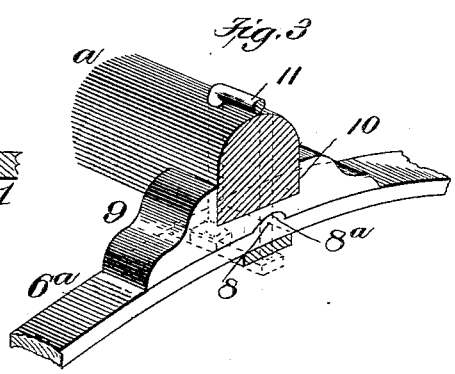
Figure 4:
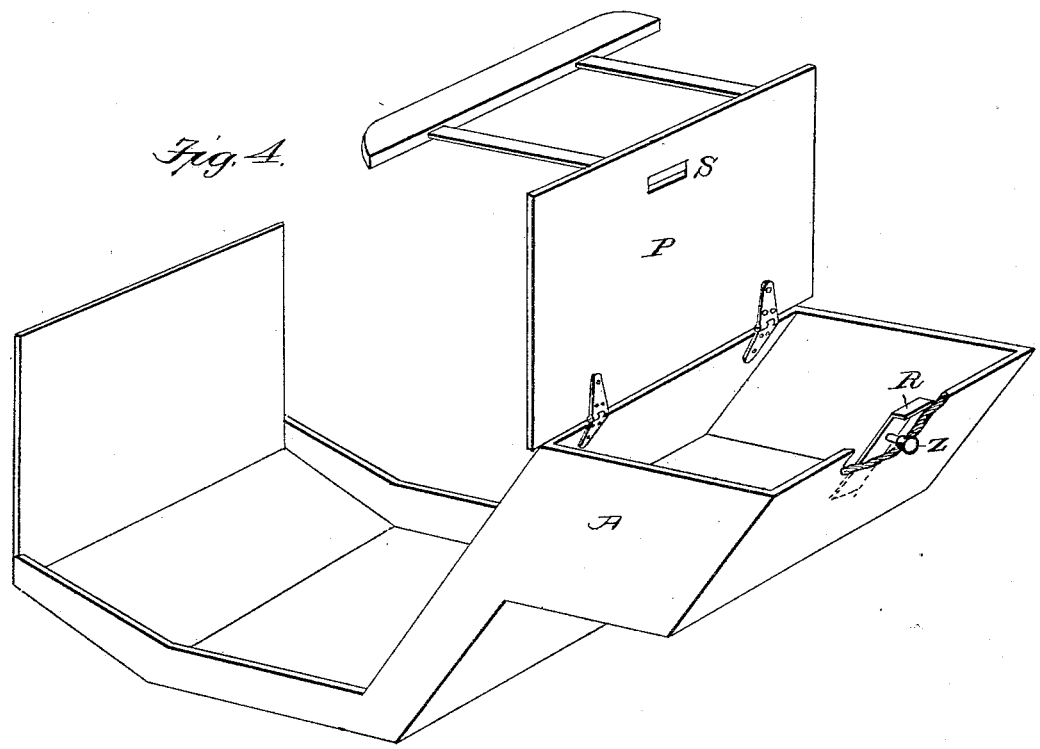

Figure 1 is a side elevation of so much of a road-cart as will serve to show my invention, part of the body bar or seat rest, and the axle being broken away. Fig. 2 is an enlarged detail view, of the connection between the axle draw spring and elliptic spring; and Fig. 3 is an enlarged detail view of the connection between the body bar or seat rest and the elliptic spring. Fig. 4 is an end view of a cart body with hinged seat raised, showing spring attachment, push button, attached to body, and fastener in seat bottom for securing or locking firmly when the seat is down.

Like symbols refer to like parts wherever they occur.

My invention relates, more especially to the construction of that class of two wheel vehicles, commonly termed "road-carts" and has for its object to relieve the body of the "horse motion" and obtain an easy fore and aft motion of the body.

To this end the main feature of my invention, embraces the combination in a road cart gear, of the axle and shafts, and interposed single plate cyma reversa draw springs rigidly attached to said axle and shafts, whereby the horse is relieved from jars and shocks, the body of the vehicle from horse motion, and easy access to the body of the vehicle is obtained.

There are other minor features of invention, all as will hereinafter more fully appear.

I will now proceed to describe my invention more fully so that others skilled in the art to which it appertains may apply the same.

In the drawings A indicates the body or seat of the road cart, $a$ the body-bar or seat rest therefor, B the axle, and C the shafts, all of which may be of any desired pattern or construction consistent with the attachment of the gear hereinafter described.

The shafts C and axle B are connected by two single plate cyma reversa draw springs 1, which occupy the position of the usual wood extension of the shafts as now commonly employed. These cyma reversa springs 1, which neutralize the horse motion, as well as relieve the horse of the jars and shocks incident to the wheel striking obstructions, are of equal thickness throughout. Said draw springs, 1, are at their forward ends bolted to the shaft C, as at 2, 2, and at their rear ends are provided on their under surfaces with teats 3, (see Fig. 2) which fit into depressions $3^a$ on the upper surface of the axle B, and on their upper surfaces with depressions $4^a$, which receive teats or projections 4 on the bottoms of the blocks or spring saddles 5, interposed between the cyma reversa draw springs 1, and the lower leaf 6, of the elliptical springs E, which support the body bar $a$ and body or seat A.

5 indicates one of the saddles which is interposed between the elliptical spring E and the draw spring 1, said saddle having a teat 4, on its under surface and a concave or curved spring seat with central depression $5^a$ to receive a teat on the outer surface of lower leaf 6 of elliptical spring E. 7 indicates a clip for connecting the elliptical spring E, saddle 5 and draw-spring 1, with the axle B. This clip 7 is preferably a twin clip of the character shown in Fig. 2, that is to say, two yokes united by a convex plate $7^a$ though if preferred the latter (convex plate $7^a$) may be an independent plate interposed between the yokes of the clips and the upper surface of spring leaf 6.

E indicates the elliptical spring of one side, which may, if desired, be of the usual form, but is preferably composed of two single leaves—6 and $6^a$—which taper at or near their ends, as indicated at $t$, $t$, to render them sensitive and quick acting as well as adapted to carry either light or heavy loads. The upper leaf $6^a$ is provided on its upper surface with a teat or projection 8, (see Fig. 3) which fits into a corresponding recess $8^a$ in the under concave surface of spring saddle 9.

9 indicates a spring saddle having a concave under surface adapted to rest on the upper leaf $6^a$ of elliptical spring E and provided on its upper surface, with a rectangular or equivalent recess 10 for the reception of the body-bar or seat rest a, and said seat rest a, is perforated for the passage of the arms of a yoke or clip 11, by means of which the body bar a and spring saddle 9 are rigidly secured to the upper leaf $6^a$ or elliptical spring E.

The body A. is secured to the body bar a in any suitable manner and the forward end thereof is connected at its bottom with the shaft by either a strap at center, or two straps one at each side, as at 12, which strap or straps are preferably attached around loop, as at 14, and act in combination with steel spring or springs, as at 13, these springs being finely tapered at end to give soft yielding motion, and are held to the straps by link and bolt at eye or end as at 15 to insure their working in harmony, and this connection gives a free rolling motion to the body.

The construction, combination and connection of the several parts of the gear being substantially such as hereinbefore specified, the cyma reversa draw springs will relieve the horse of the sudden jars and shocks incident to the wheels striking obstructions, and said draw springs from their shape will afford easy access to the body A of the vehicle. At the same time said draw-springs co-acting with the elliptical springs which support the body and with the steel spring and strap connection of body to shaft cross bar will relieve the body of all horse-motion and permit an easy fore and aft motion of the body.

The seat P is hinged to body A see Fig. 4 and when down or closed is firmly locked or secured by the spring fastening R which springs into holder S in seat bottom and which spring is released by push button Z when raising seat, this securing in position to prevent rattling or knocking when cart is light loaded or empty.

Having thus described my invention, what I claim, and desire to secure by Letters Patent, is—

1. In a road cart the combination with the axle and shafts, of interposed cyma-reversa single plate draft springs rigidly connected with the axle and shafts, and a body, spring supported from the axle; substantially as and for the purposes specified.

2. In a road cart, the combination with the axle and shafts, of interposed cyma reversa single plate draft springs rigidly connected with the axle and shafts, a body, and single plate elliptic springs rigidly attached to the axle, and which support the body from the axle, substantially as and for the purposes specified.

3. In a road cart, the combination with the axle and shafts, of interposed cyma reversa single plate draft springs rigidly connected to the axle and shafts, elliptical single plate springs rigidly attached to the axle, a body supported by the single plate elliptical springs, and strap and spring connections between the front of the body and the shafts, substantially as and for the purposes specified.

4. The combination with the body bar or rest, and the upper spring leaf, of the spring saddle having a recess for the body bar, and a yoke or clip which passes through the body bar and straddles the spring leaf, substantially as and for the purposes specified.

In testimony whereof I affix my signature, in presence of two witnesses, this 13th day of May, 1892.

JOHN BELMER ARMSTRONG.

Witnesses:
J. S. McKAY,
C. W. PARKER.